(12) United States Patent
Leppanen et al.

(10) Patent No.: US 8,760,289 B2
(45) Date of Patent: Jun. 24, 2014

(54) WARNING SYSTEM

(75) Inventors: Jarmo Uolevi Leppanen, East Rand (ZA); Ockert Oosthuizen, East Rand (ZA)

(73) Assignee: Sandvik Mining and Construction RSA (Pty) Ltd. (ZA)

( * ) Notice: Subject to any disclaimer, the term of this patent is extended or adjusted under 35 U.S.C. 154(b) by 262 days.

(21) Appl. No.: 13/130,674

(22) PCT Filed: Oct. 22, 2009

(86) PCT No.: PCT/ZA2009/000092
§ 371 (c)(1),
(2), (4) Date: Jul. 13, 2011

(87) PCT Pub. No.: WO2010/063039
PCT Pub. Date: Jun. 3, 2010

(65) Prior Publication Data
US 2011/0260847 A1    Oct. 27, 2011

(30) Foreign Application Priority Data
Nov. 25, 2008  (ZA) .............................. 2008/09989

(51) Int. Cl.
G08B 1/08 (2006.01)
(52) U.S. Cl.
USPC .................. 340/539.23; 340/539.1; 340/435; 340/686.6; 340/573.1; 340/901; 340/903
(58) Field of Classification Search
USPC ......... 340/539.23, 539.1, 539.11, 540, 686.6, 340/679, 573.1, 435, 901, 903; 367/93, 94
See application file for complete search history.

(56) References Cited

U.S. PATENT DOCUMENTS

| 4,937,795 | A | | 6/1990 | Motegi et al. | |
|---|---|---|---|---|---|
| 5,198,800 | A | * | 3/1993 | Tozawa et al. | ............. 340/573.1 |
| 5,939,986 | A | | 8/1999 | Schiffbauer | |
| 6,208,260 | B1 | | 3/2001 | West et al. | |
| 6,963,278 | B2 | * | 11/2005 | Frame | ....................... 340/539.22 |
| 7,167,082 | B2 | * | 1/2007 | Stigall | ......................... 340/407.1 |
| 2003/0151508 | A1 | | 8/2003 | Frame | |
| 2004/0113774 | A1 | | 6/2004 | Wilson | |
| 2005/0046562 | A1 | | 3/2005 | Monolithics | |
| 2006/0087443 | A1 | * | 4/2006 | Frederick et al. | .......... 340/686.6 |
| 2010/0289662 | A1 | * | 11/2010 | Dasilva et al. | ............. 340/686.6 |
| 2011/0050444 | A1 | * | 3/2011 | Stull | ......................... 340/686.6 |

FOREIGN PATENT DOCUMENTS

WO    9713232 A1    4/1997

OTHER PUBLICATIONS

International Search Report; PCT/ZA2009/000092; Int'l File Date: Oct. 22, 2009; 4 pages.
International Preliminary Report on Patentability; FORM PCT/IPEA/409, PCT/ZA2009/000092; Int'l File Date: Oct. 22, 2009; 9 pages.
Written Opinion of the International Searching Authority; PCT/ZA2009/000092; Int'l File Date: Oct. 22, 2009; 3 pages.

* cited by examiner

Primary Examiner — Hung T. Nguyen
(74) Attorney, Agent, or Firm — Schmeiser, Olsen & Watts, LLP

(57) ABSTRACT

A warning system in which an audio pulse train is continuously emitted from an item of equipment and wherein a person, exposed to the audio pulse train, carries a detector which, in response to detection of the pulse train, emits audio pulses which are detected at the item of equipment.

12 Claims, 2 Drawing Sheets

WARNING SYSTEM

BACKGROUND

The following relates to a warning system which is particularly suitable for use in a situation in which personnel are exposed to moving machinery.

The invention is described hereinafter with reference to its application in a mining environment but this is by way of example only for the principles of the invention are applicable to other situations and installations.

In an underground location in a mine, personnel are often exposed to moving mining machinery. Large machines are used for mining-related tasks and, typically, each machine is controlled by an operator who sits in a cabin on the machine or who controls the machine via a remote control arrangement. The operator's field of view in the vicinity of the machine can be severely restricted and, in addition, due to environmental factors such as poor visibility, noise and rough terrain it can be extremely difficult for an operator to be aware of the presence of personnel in the vicinity of the machine. These machines can thus pose a serious safety threat to humans and, unfortunately, serious injuries and deaths do occur.

U.S. Pat. No. 4,937,795 describes an alarm system which operates at ultrasonic frequencies and which addresses some of the aforementioned issues. However the system is directional in nature and offers limited application.

Thus, there is a need to provide a system which, at least partly, addresses the aforementioned situation.

SUMMARY

An aspect relates generally to a warning system which includes, for an item of equipment, a first transmitter, a first receiver and a first actuator and, for at least one person who is in the vicinity of the item of equipment, a second transmitter, a second receiver and a second actuator, wherein the first transmitter is operated to emit a first signal and the second receiver, upon detecting the first signal, enables the second actuator to alert the person to the proximity of the item of equipment and enables the second transmitter to emit a second signal, and the first receiver, upon detecting the second signal, enables the first actuator to indicate the proximity of the person to the item of equipment, characterised in that the first and second signals are audio signals, at least the first signal is audible to the person, and the second actuator, when enabled, emits an alerting signal to alert the person to the proximity of the item of equipment, wherein the alerting signal is a visual signal, an audible signal, or a vibratory signal.

The first actuator, when enabled, may produce an audio signal or a visual signal or both to alert an operator of the item of equipment to the proximity of the person. The first actuator may be connected to the item of equipment so that, when enabled, it assumes at least partial control of the item of equipment, for example by shutting the item of equipment down or otherwise interrupting its operation.

The second transmitter, the second receiver and the second actuator may be contained in an integral package to be carried by the person. At least part of these components may for example be attached to a safety helmet which, according to law, is required to be worn by each person in an underground situation.

The system may include a processor, associated with the item of equipment, which uses data from the first and second audio signals and calculates the spacing between the item of equipment and the person. This distance data can be displayed or otherwise made available to an operator of the item of equipment.

Data of any appropriate nature could be transmitted, according to requirement by either transmitter, or by both transmitters. Through the use of appropriate modulation techniques data can be encoded with each audio signal. For example the audio signal may comprise a plurality of audio pulses which can be modulated on a time or width basis, or encoded in digital form, to transmit data. This is done in addition to the proximity sensing and notification/signalling.

Alternatively a first set of pulses can be used for proximity detection and signalling, and a second set of pulses for data transmission. The second set of pulses could be transmitted after the first set, and so on, or the two sets of pulses could otherwise be interspersed in any appropriate way.

The first audio signal may be modulated in order to distinguish the first audio signal electronically from other noise or sounds.

The second audio signal may also be modulated.

The first audio signal may comprise a plurality of modulated pulses. The second audio signal may comprise a plurality of modulated pulses.

Each pulse in the second audio signal may commence upon detection of the end of a modulated pulse in the first audio signal.

The first audio signal may be encoded so that it is uniquely associated with the item of equipment. Similarly, the second signal may be encoded so that it is uniquely associated with the person from which the second signal originates.

Alternatively or additionally, as referred to hereinbefore, the audio signals could be encoded or otherwise manipulated, or used together with other signals, which are suitably encoded, to transmit data, not related to the proximity detection function, e.g. the operation of an item of equipment, control of a mining, drilling or blasting process, and so on. The invention is not limited in this respect.

BRIEF DESCRIPTION OF THE DRAWINGS

The invention is further described by way of example with reference to the accompanying drawings in which.

DETAILED DESCRIPTION

Figure 1:
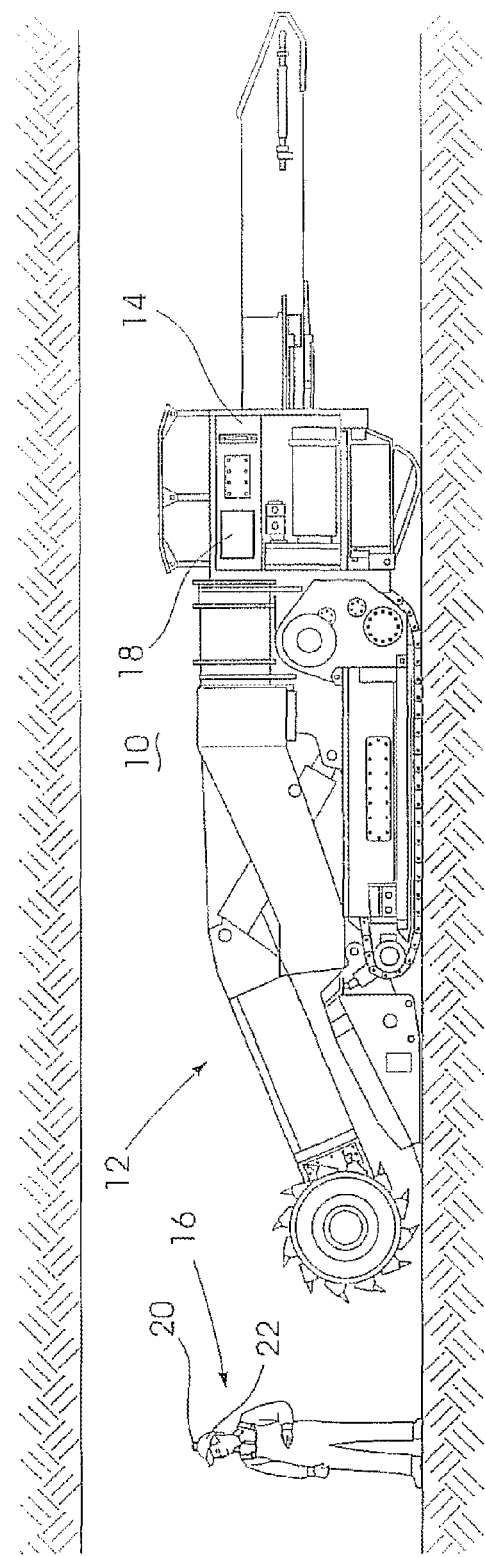
FIG. 1 represents one way in which the warning system of the invention can be used.

FIG. 1 of the accompanying drawings illustrates an underground excavation 10 in which a warning system 12 according to the invention is used.

A mining vehicle 14 is operative in the underground location. The mining vehicle may be of any kind which is known in the art. Personnel 16 are also operative in the location 10. An intention of the system of the invention is to alert an operator of the vehicle 14 and each of the personnel 16 of a potential danger which could arise when the vehicle is in close proximity to such person.

The vehicle 14 is equipped with a unit 18 and each person 16 is equipped with a respective unit 20. The unit 20 may be carried by the person 16 in any appropriate way and, for example, the unit may be attached to a hard hat or helmet 22 which is worn by such person. According to law a hard hat should be worn at all times. The unit 20 could be carried in an alternative way, for example by being attached to a belt or other prescribed garment or device which, according to law, must be worn.

Figure 2:
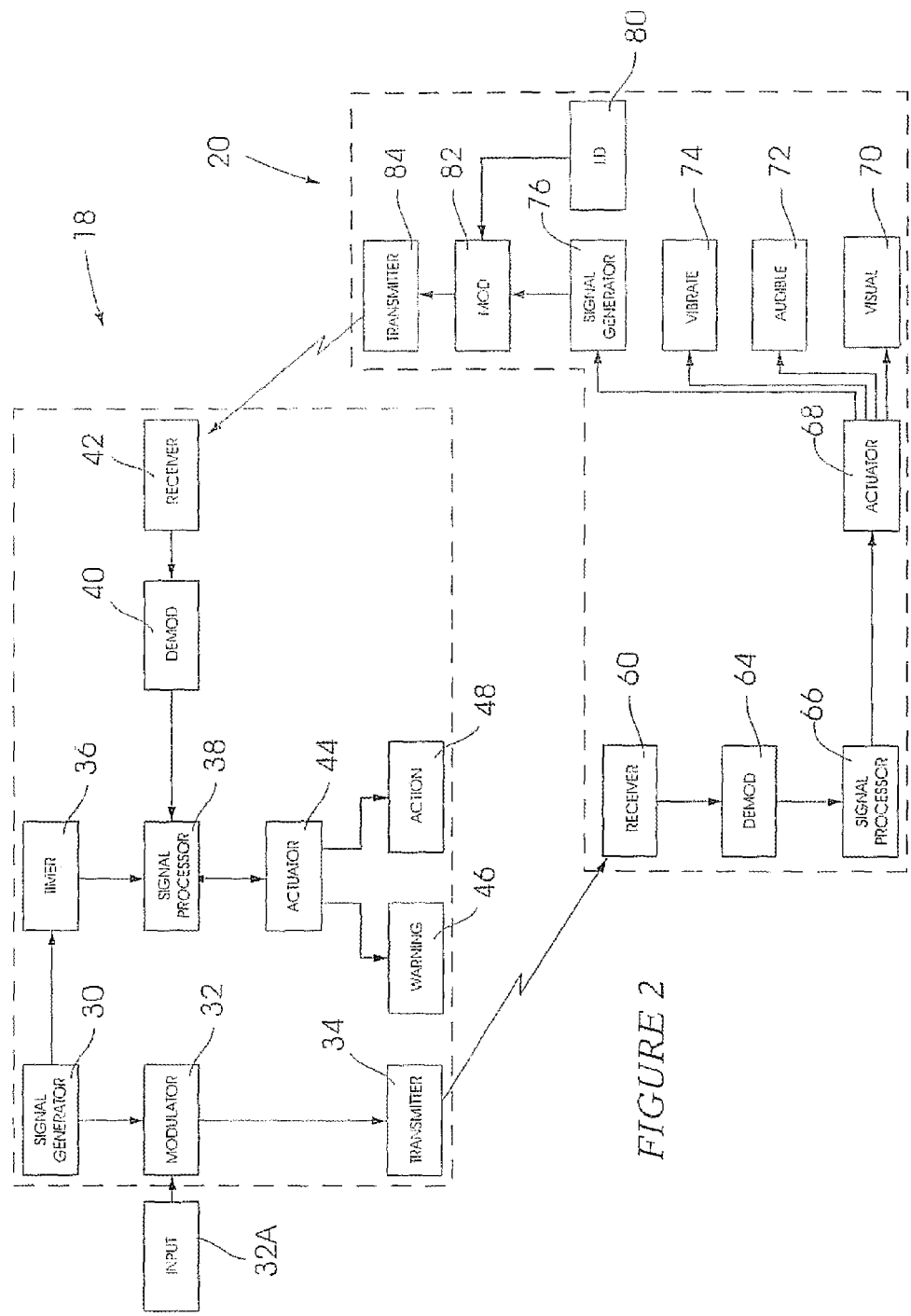
FIG. 2 illustrates, in block diagram form, various elements of the warning system of the invention.

FIG. 2 shows, in block diagram form, the units 18 and 20. The unit 18 includes a signal generator 30, a modulator 32, a transmitter 34, a timer 36, a signal processor 38, a demodulator 40, a receiver 42, an actuator 44, and output devices 46 and 48 which are connected to the actuator.

The unit 20 has a number of similarities to the unit 18 and includes a receiver 60, a demodulator 64, a signal processor 66, an actuator 68, visual, audible and vibratory output devices 70, 72 and 74 respectively, a signal generator 76, a storage device 80 which contains a unique identity number, a modulator 82 and a transmitter 84.

In use of the system the signal generator 30, carried by the vehicle 14, is operated to generate an audio signal which consists of spaced, successive acoustic pulses (sounds) with a respective silent period (no sound) between adjacent pulses. The audio signal can then be described as consisting of a continuous pulse train. The pulses are modulated in the modulator 32 in order to distinguish them electronically from other types of sounds. An audio signal consisting of the modulated pulse train is continuously emitted by the transmitter 34. This transmitter has a limited range and persons who are outside of the range cannot hear the pulses nor can a receiver 60, carried by any of such persons, detect the pulses.

Assume that a person, equipped with a unit 20, moves into the range of the pulses from the transmitter 34. The pulses are received by the receiver 60 and are demodulated by the unit 64. The demodulated audio signals are applied to the signal processor 66 which contains filters and discriminating circuits. The processor 66 operates at a specific narrow frequency band in order to reject noise which does not originate from the signal generator 30 and which, to a greater or lesser extent, could mask the signal embodied in the modulated pulse train. The processor 66 also identifies the strongest unwanted noise signal and engages in a predictive process to subtract the unwanted noise signal from the total incoming signal. A custom-designed technique is used to amplify the wanted signals selectively using the unique coding of the wanted signal. In this way the signal processor 66 is able to reject substantially all of the background and extraneous noise signals in the input signal and to identify, positively, a signal as having originated from the generator 30.

The actuator 68, upon positive identification of a signal originating from the signal generator 30, responds in a way which alerts the person carrying the unit 20 that the vehicle 14 is in close proximity to the person and therefore that a potentially dangerous situation has arisen. The actuator can energise a visual indicator e.g. a lamp 70 or an audible generator 72 such as a sound generator which emits a high-pitched distinctive signal. Another possibility is for the person to be alerted by means of a vibratory device 74 which is energised by the actuator 68. The device 74 could be housed in a band worn, for example, on an arm or leg of the person.

The actuator 68 also energises the signal generator 76. This generates a train of audible pulses which are uniquely modulated and which carry the identity data associated with the person. The modulated signal is emitted by the transmitter 84 and detected by the receiver 42. After demodulation in the unit 40 the signal is applied to the signal processor 38 which functions in a similar manner to the processor 66 to extract the desired signal and to reject background noise signals.

It is preferable if the generation of the pulses by the generator 76 is linked to the pulses originated in the generator 30 in that each pulse coming from the generator 76 commences at the end of a pulse, originated in the generator 30, as detected by the signal processor 66. This simplifies the identification of the pulses, and the processing of the information conveyed by the pulses. The timer 36 is capable of timing the interval between the end of the pulse from the generator 30 and the start of a responsive pulse from the signal generator 76. This information is used by the signal processor 38 to calculate the distance between the vehicle 14 and the person who carries the unit 20. If this distance is below a predetermined minimum then the actuator 44, in response to the signal processor 38, can generate a warning signal via the output device 46 to alert the operator of the vehicle 14. The warning signal could be audible, visual or vibratory in nature. It is also possible via the output device 48 for the actuator to initiate action independently of the operator of the vehicle. For example the actuator can be connected to the vehicle so that in an emergency situation the vehicle is disabled by turning off its engine or by interrupting an electrical supply to the vehicle, as the case may be.

The invention has been described with reference to the detection or signalling of proximity. However, the capability to transmit pulses carries with it the possibility of being able to transmit data from each transmitter to a corresponding receiver. The audio pulses used for proximity detection, suitably modulated, can be used for this purpose. Alternatively or additionally audio pulses can be specifically generated for data transmission purposes. These data pulses can be used for diverse applications e.g. to control the operation of a mining or drilling machine, a blasting process, and so on. For example, the modulator 32, in response to data signals 30A, input by an operator, could modulate the audio pulse train transmitted to the receiver 60. The relevant extracted data is then made available to an operator e.g. via the visual device 70, who is thereby instructed to execute certain processes or steps. Similarly, in the reverse direction, data can be transferred by the operator to a person who controls the functioning of the vehicle 14.

Another refinement, suitable for use in an area traversed by a number of vehicles, is to allocate to each vehicle a respective unit 18 which emits an audio signal, in the manner described, which is encoded or otherwise processed so that it is uniquely associated with the vehicle from which it originates. When two vehicles come within signal range of each other the transmitted audio signals are detected by the respective vehicles.

This arrangement lends itself to a collision avoidance system for a detected signal, from a first vehicle in close proximity to a second vehicle, or other equipment, can be used to initiate a warning to an operator, to stop an engine, to interrupt a mining activity, or the like.

The system of the invention holds a number of benefits. Humans can directly detect (hear) the audio signals coming from the unit 18. Thus a check on the operation of the unit is, automatically, done by the humans involved. The audible pulses coming from the generator 30 in essence duplicate existing audible warning systems and fulfil the same functions. Sound is not as directional as a radio frequency signal and this enables the safety function to be established on an omni-directional basis. The sound signals propagate well in hazardous areas irrespective of the presence of metal, the types of rock or dust in the area, the usage of two-way radios and the like. Also, the sound signals can be used for the exchange of data which is not dependent on the proximity detection function.

The invention claimed is:

1. A warning system, for an item of equipment, comprising:
 a first transmitter;
 a first receiver and a first actuator and, for at least one person who is in a proximity of the item of equipment, a second transmitter;
 a second receiver and a second actuator, wherein the first transmitter is operated to emit a first signal and the second receiver, upon detecting the first signal, enables the second actuator to alert the person to the proximity of the item of equipment and enables the second transmitter to emit a second signal, and the first receiver, upon detecting the second signal, enables the first actuator to indicate the proximity of the person to the item of equipment;
 wherein the first signal and the second signal are audio signals, at least the first signal is audible to the person; and
 wherein the second actuator, when enabled, emits an alerting signal to alert the person to the proximity of the item of equipment, further wherein the alerting signal is at least one of a visual signal, an audible signal and a vibratory signal.

2. A warning system according to claim 1, wherein the first actuator, when enabled, produces a signal to alert an operator of the item of equipment to the proximity of the person.

3. A warning system according to claim 1, wherein the first audio signal comprises a plurality of modulated pulses and the second audio signal comprises a plurality of modulated pulses.

4. A warning system according to claim 3, wherein each pulse in the second audio signal commences upon detection of the end of a respective modulated pulse in the first audio signal.

5. A warning system according to claim 1, wherein the first audio signal is encoded so that it is uniquely associated with the item of equipment and the second signal is encoded so that it is uniquely associated with the person from which the second signal originates.

6. A warning system according to claim 1, wherein the first audio signal is also used to transfer data which is not related to the proximity of the person.

7. A warning system according to claim 1, wherein the second audio signal is also used to transfer data which is not related to the proximity of the person.

8. A warning system according to claim 1, wherein the first audio signal is also used to transfer data which is related to the proximity of additional equipment.

9. A warning system according to claim 2, wherein the first audio signal comprises a plurality of modulated pulses and the second audio signal comprises a plurality of modulated pulses.

10. A warning system according to claim 2, wherein the first audio signal is encoded so that it is uniquely associated with the item of equipment and the second signal is encoded so that it is uniquely associated with the person from which the second signal originates.

11. A warning system according to claim 3, wherein the first audio signal is encoded so that it is uniquely associated with the item of equipment and the second signal is encoded so that it is uniquely associated with the person from which the second signal originates.

12. A warning system according to claim 4, wherein the first audio signal is encoded so that it is uniquely associated with the item of equipment and the second signal is encoded so that it is uniquely associated with the person from which the second signal originates.

* * * * *